(12) United States Patent
Harley et al.

(10) Patent No.: US 6,322,894 B1
(45) Date of Patent: Nov. 27, 2001

(54) MATTE SURFACE FILM WITH IMPROVED CUTTABILITY

(75) Inventors: Lyle J. Harley, Newark; Pang-Chia Lu, Pittsford, both of NY (US)

(73) Assignee: ExxonMobil Oil Corporation, Fairfax, VA (US)

( * ) Notice: Subject to any disclaimer, the term of this patent is extended or adjusted under 35 U.S.C. 154(b) by 0 days.

(21) Appl. No.: 09/307,011

(22) Filed: May 7, 1999

(51) Int. Cl.$^7$ .................................................. B32B 27/32
(52) U.S. Cl. ......................... 428/447; 428/516; 428/910; 428/195; 264/173.15; 264/173.19
(58) Field of Search .................................. 428/515, 516, 428/910, 447, 195; 264/173.15, 173.19, 290.2

(56) References Cited

U.S. PATENT DOCUMENTS

| | | | |
|---|---|---|---|
| 5,516,563 | * | 5/1996 | Schumann et al. ............... 428/34.2 |
| 5,725,962 | * | 3/1998 | Bader et al. ....................... 428/515 |
| 5,891,555 | * | 4/1999 | O'Brien ............................. 428/213 |
| 5,981,047 | | 11/1999 | Wilkie .............................. 428/215 |

FOREIGN PATENT DOCUMENTS

| | | |
|---|---|---|
| 0365463 | 8/1989 | (EP) . |
| 0781652A2 | 12/1996 | (EP) . |

* cited by examiner

*Primary Examiner*—Paul Thibodeau
*Assistant Examiner*—D Lawrence Tarazano
(74) *Attorney, Agent, or Firm*—Dennis P. Santini

(57) ABSTRACT

The present invention relates to a matte surface film comprising:

(a) a base layer comprising high density polyethylene (HDPE); and (b) a matte surface layer comprising a blend of two or more incompatible polyolefins. In preferred embodiments, the matte surface layer comprises (i) a propylene homopolymer or propylene interpolymer and (ii) an ethylene homopolymer or ethylene interpolymer. The film possesses easy and improved cuttability and may be used for packaging and label applications.

17 Claims, No Drawings

MATTE SURFACE FILM WITH IMPROVED CUTTABILITY

FIELD OF THE INVENTION

The present invention relates to a matte surface film. More particularly, the present invention relates to a multilayer polyolefin matte surface film having improved cuttability.

BACKGROUND OF THE INVENTION

Matte surface films have a variety of useful purposes. Primarily, they form a good background for displaying printed or artful images on the film. The images can be printed onto the matte surface film by any conventional plastic printing process.

Mobil Chemical Company film product "70 MLT" is a matte surface biaxially oriented multilayer film. The base layer is oriented polypropylene and the matte surface skin layer comprises a mixture of polyethylenes and an ethylene-propylene-butene-1 terpolymer. The matte surface film has a dull surface appearance; that is, it is not shiny or glossy. Such a surface appearance is not typical of most biaxially oriented films used in packaging but is advantageous in that it provides an unusual appearance when reverse printed on the side opposite to the matte surface.

While the above-described matte surface film is excellent in many respects, it would be desirable to produce a matte surface film that can be easily cut through and yet is suitable for a variety of applications (e.g., packaging or label applications).

U.S. Pat. No. 5,492,757 to Schuhmann, et al. discloses an opaque, matte, multilayer polypropylene film having at least one base layer and at least one interlayer, and an outer layer applied to this interlayer. The base layer includes polypropylene and fillers. The interlayer includes a mixture or blend of two components I and II, wherein component I is a propylene homopolymer or a copolymer of α-olefins having 2 to 10 carbon atoms, or a terpolymer of α-olefins having 2 to 10 carbon atoms, or a mixture or blend of these polymers and component II is a high density polyethylene (HDPE) or a blend of HDPE and a propylene homopolymer or copolymer of a copolymer of α-olefins having 2 to 10 carbon atoms, or a terpolymer of α-olefins having 2 to 10 carbon atoms, or a mixture or blend of these polymers. The outer layer essentially includes a copolymer of α-olefins having 2 to 10 carbon atoms, or a terpolymer of α-olefins having 2 to 10 carbon atoms, or a mixture or blend of these polymers.

U.S. Pat. No. 5,494,717 to Peiffer, et al. discloses a heat-sealable, shrinkable multilayer film which comprises at least one base layer containing a propylene polymer or a propylene polymer mixture and at least one outer layer which comprises a mixture or blend of two components I and II, wherein the mixture contains copolymers or terpolymers of α-olefins having 2 to 10 carbon atoms and HDPE.

U.S. Pat. No. 5,496,600 to Peiffer, et al. discloses a multilayer polypropylene film which contains at least one base layer containing polypropylene or a polypropylene mixture and resin, and at least one outer layer which contains a mixture or blend of two components I and II.

U.S. Pat. No. 5,516,563 to Schumann, et al. discloses an opaque, matte, multilayer polypropylene film including at least one base layer comprising polypropylene or a polypropylene mixture and fillers, and at least one outer layer which contains a mixture or blend of two components I and II.

Similarly, U.S. Pat. No. 5,618,369 to Peiffer, et al. discloses a matte multilayer polypropylene film which includes at least one base layer containing polypropylene and migrating additives or a mixture of migrating additives, and at least one outer layer which includes a mixture or blend of two components I and II.

None of these references, however, disclose or suggest a matte surface film having improved cuttability in which the base layer contains HDPE.

SUMMARY OF THE INVENTION

The present invention is directed to a matte surface film comprising:

(a) a base layer comprising high density polyethylene (HDPE); and (b) a matte surface layer comprising a blend of two or more incompatible polyolefins.

In a preferred embodiment of the present invention, the blend of the incompatible polyolefins contained in the matte surface layer comprises (i) a propylene homopolymer or propylene interpolymer and (ii) an ethylene homopolymer or ethylene interpolymer.

It is an object of the invention to produce a film having a matte surface layer, which has easy or improved cuttability.

It is a further object of this invention to produce a matte surface film having easy cuttability and yet is suitable for various applications such as packaging and labels.

It is also an object to produce a matte surface film, which has easy or improved cuttability, as well as a rough surface and low gloss.

DETAILED DESCRIPTION OF THE INVENTION

The easy or improved cuttability of the matte surface film of the present invention is achieved by providing a base layer comprising a HDPE. In general, the HDPE that may be used in the present invention has a density of about 0.940 to about 0.980 g/cm$^3$, a melting point of about 115 to about 140° C., and a melt index of about 0.5 to about 12 g/10 minutes (measured in accordance with ASTM D 1238 under a load of 2.16 kg at 190° C.). Most preferably, the HDPE contained in the base layer has a density of about 0.950 to about 0.970 g/cm$^3$, a melting point of about 120 to about 134° C., and a melt index of about 1 to about 6 g/10 minutes.

Particularly useful HDPE polymers for producing the base layer include, but are not limited to, HDPE M6211 and HDPE M-6030 sold by Lyondell Chemical Company, HD-6704.67 sold by Exxon Chemical Company, and the like.

The matte surface layer is formed by providing any blend of two or more incompatible polyolefins. Examples of suitable blends include a HDPE/ethylene-propylene-butylene (EPB) terpolymer blend, a polypropylene (PP)/HDPE blend, a PP/EPB terpolymer blend, an ethylene-propylene (EP) copolymer/polyethylene blend, and a PP/polyethylene/EPB terpolymer blend. In particular, the matte surface layer comprises a blend of: (i) a propylene homopolymer or propylene interpolymer; and (ii) an ethylene homopolymer or ethylene interpolymer. For purposes of the present invention, the term "interpolymer" includes various polymers other than homopolymers, such as random copolymers, terpolymers, etc., as well as block polymers, graft polymers, etc.

In the present invention, the polymer blend of the matte surface layer which has demonstrated effectiveness comprises a blend of (i) at least one of (1) a copolymer of ethylene and propylene or (2) a terpolymer of ethylene, propylene, and a $C_4$ to $C_{10}$ alpha-olefin or (3) propylene homopolymer; and (ii) an ethylene polymer.

Typically the copolymer of ethylene and propylene and the terpolymer of ethylene, propylene and a $C_4$ to $C_{10}$ alpha-olefin are comprised predominantly of propylene. Such copolymer or terpolymer, typically contains more than about 80% propylene. The ethylene polymer (ii) may include a copolymer or a blend of different kinds of ethylene polymers. For example, the ethylene polymer may be a blend of two or more ethylene polymers each having different densities. In one embodiment that is contemplated, the ethylene polymer comprises at least a first ethylene polymer having a density of at least about 0.91 g/cm³ and a second ethylene polymer having a density which is different from the density of the first ethylene polymer. For example, the blend may comprise high density polyethylene and low density polyethylene or linear low density polyethylene. The ratio of the blend will vary depending upon the polyethylene components of the blend and the desired characteristics of the surface layer. In general, a blend in which an equal proportion of each component is employed, such as a 50:50 blend, may be useful. However, a useful blend has been found to be of 50% ethylene-propylene-butene-1 terpolymer, 40% high density polyethylene (0.95 g/cm³), and 10% of a lower density polyethylene (approx. 0.92 g/cm³).

Specific examples of useful polymer blends are described in U.S. Pat. Nos. 4,487,871; 4,508,786 or 5,451,468.

In U.S. Pat. Nos. 4,487,871 and 4,508,786, a film is described which is made from a blend of a crystalline propylene-alpha-olefin copolymer containing 70% by weight or more of a propylene component and having a crystalline melting point of 150° C. or lower with a high density polyethylene having a density of 0.940 g/cm³ or higher in blending proportions of 96 to 80% by weight of the copolymer and 4 to 20% by weight of the polyethylene, the ratio of the melt flow rate of the polyethylene to the melt flow rate of the copolymer is equal to or greater than 0.7. Specific examples of the copolymers are ethylene-propylene copolymer, propylene-butene-1 copolymer and ethylene-propylene-butene-1 terpolymer. The high density polyethylene has a density of 0.94 g/cm³ and may be a copolymer of ethylene, as a main component, and an alpha-olefin comonomer (for example, butene-1, pentene-1, hexene-1, heptene-1 or octene-1).

U.S. Pat. No. 5,451,468 discloses a packaging film with a sealable skin layer which is made from a mixture of from 50 to 80% by weight of a random terpolymer (I) of from 90 to 97% by weight of propylene, from 2 to 6% by weight of ethylene and from 1 to 6% by weight of a $C_4$ to $C_{10}$ alk-1-ene and from 20 to 50% by weight of at least one ethylene polymer (II). The term $C_4$ to $C_{10}$ alk-1-ene is preferred to mean but-1-ene, pent-1-ene, hex-1-ene, hept-1-ene, or oct-1-ene. The ethylene polymer component of the sealing layer is a homopolymer of ethylene and copolymer of ethylene with other comonomers included in the term. The preferred homopolymer is a low density or a high density polyethylene (density ranging from 0.890 to 0.980 g/cm³). Suitable copolymers of ethylene are described as containing minor amounts of unsaturated comonomers, for example vinyl acetate or $C_3$–$C_{10}$-alk-1-enes, such as propylene, but-1-ene, hex-1-ene or oct-1-ene. A typical ethylene polymer has a density of from 0.900 to 0.935 g/cm³.

Commercially available polymer blend products which may be used to form the matte surface layer include a blend of 50 parts by weight of XPM-7510 ethylene-propylene-butene-1terpolymer sold by Chisso Corporation with 50 parts by weight of PE-1845 low density polyethylene sold by Dow Chemical Company, or a blend of 50 parts by weight of Chisso XPM-7510 ethylene-propylene-butene-1 terpolymer with 50 parts by weight of Fina 3371 polypropylene.

Additionally, it is particularly advantageous to use a blend of about 50% by weight of a HDPE with about 50% by weight of a conventional ethylene-propylene-butene-1 terpolymer to form the matte surface layer. The HDPE has a melting point of about 132 to about 134° C., a melt index of about 0.1 to 2 g/10 minutes, and a density of about 0.955 g/cm³. The ethylene-propylene-butene-1 terpolymer mainly comprises propylene units with about 10% by weight or less of ethylene and 10% by weight or less of butene-1, and has a melting point of about 122 to about 126° C.

The matte surface layer of this invention may also include a particular polydialkylsiloxane additive. The polydialkylsiloxane additive is especially selected because it reduces the friction between the matte surface and the machine surfaces with which the matte surface comes into contact during processing while maintaining the "matte" appearance of the film. The polydialkylsiloxane additive also reduces the accumulation of resin on the die surfaces during extrusion, which minimizes this resin accumulation, commonly referred to as "die drool." This is useful because it reduces the frequency for die cleaning and the chance for film breakage.

It is contemplated that the incompatible blend of polymers of the matte surface layer results in "die drool" because the lower molecular weight materials migrate to the die surface and form a deposit which builds-up over time. The polydialkylsiloxane additive mitigates this effect.

In an embodiment of the invention, the polymer blend of the matte surface layer is compounded with an amount of a polydialkylsiloxane sufficient to reduce friction when the film is formed or when it is manipulated in packaging machinery.

The polydialkylsiloxane that may be used in this invention can be more particularly defined as a polydialkylsiloxane selected from the group consisting of (1) a polydialkylsiloxane having a number average molecular weight above about 250,000, typically above about 300,000 and a viscosity of above about 10,000,000 cSt., usually ranging from about 15,000,000 to about 20,000,000 cSt., or (2) a polydialkylsiloxane functionalized polyolefin.

The alkyl group of the polydialkylsiloxane usually ranges from 1 to about 10 carbon atoms, more usually from 1 to about 3 carbon atoms, which carbon atoms can be in a straight or branched chain configuration.

When the polydialkylsiloxane is (2), a polydialkylsiloxane functionalized polyolefin, the polyolefin usually contains about 2 to about 4 carbon atoms which are usually in the form of a homopolymer. Typically, the polydialkylsiloxane is grafted onto a polypropylene backbone. However, a particularly useful polyolefin is polyethylene or polypropylene, although a copolymer, such as ethylenepropylene copolymer or ethylene-propylene-butene-1 terpolymer might be useful. A commercially available polydialkylsiloxane functionalized polyolefin which is useful in the films of this invention is available from DuPont under the trademark "Bynel" 2045-174-01.

One particular kind of polydialkylsiloxane used in this invention is referred to as "silicone gum," also described as an "ultra high molecular weight silicone." Silicone gum can be in the form of a silicone polymer dispersed in polypropylene. Silicone gum of this kind is available in a masterbatch form from the Dow Corning Corporation, of Midland Mich., under the product designation "MB50-001" which contains 1.25% silicone.

The ratio of polydialkylsiloxane to the polymer blend of the matte surface layer is, typically, very low and in an amount sufficient to improve machinability of the matte surface layer. While the ratio of the polydialkylsiloxane to the polyolefin will vary, typically, depending upon the nature of the polydialkylsiloxane and the nature of the olefinic component, the polydialkylsiloxane content ranges from about 0.05 to about 10 weight percent, specifically about 0.1 to about 1 weight percent based on the total weight of the matte surface layer.

On a side of the base layer opposite to the side on which the matte surface layer is situated, there may be a film-forming polymer having properties appropriate for extrusion and uniaxial or biaxial orientation (by stretching the extrudate in the machine direction and/or transverse direction under elevated temperatures) and for forming a skin layer. Such a layer usually comprises a thermoplastic polymer, which may be composed predominantly of an olefinic polymer such as propylene homopolymer, ethylene homopolymer, propylene or ethylene copolymer or terpolymer of propylene, ethylene and a $C_4$ to $C_{10}$ alpha-olefin. This thermoplastic polymer layer may be a copolymer or terpolymer of ethylene, propylene and butylene or another olefin having 5 to 10 carbon atoms or a mixture of these olefin polymers. It may be the same or different from the layer which provides the matte surface. Usually, when it is desirable for this layer to be printable, sealable, or treatable for printing or sealing, it is comprised of an ethylene homopolymer having a density of about 0.91 to about 0.96 g/cm$^3$, ethylene-propylene copolymer in which the ethylene content is about 2 to 10% by weight based upon the total weight of the copolymer or an ethylene-propylene-butene-1 terpolymer in which the ethylene content is about 0.5 to about 7 weight % ethylene and about 5 to about 30 weight % butylene, each based upon the total weight of the terpolymer.

Sometimes it is useful to enhance film properties or provide the film with certain properties by use of appropriate film additives. Such additives are used in effective amounts, which vary depending upon the property required, and are, typically selected from the group consisting of: antiblock, slip additive, antioxidant additive, moisture barrier additive or gas barrier additive. These additives may be included in the base layer, the matte surface layer, or any other layer.

Useful antistatic additives which can be used in amounts ranging from about 0.05 to about 3 weight %, based upon the weight of the layer, include alkali metal sulfonates, polyether-modified polydiorganosiloxanes, polyalkylphenylsiloxanes and tertiary amines.

Useful antiblock additives used in amounts ranging from about 0.1 weight % to about 3 weight % based upon the entire weight of the layer include inorganic particulates such as silicon dioxide, e.g. a particulate antiblock sold by W.R. Grace under the trademark "SIPERNAT 44," calcium carbonate, magnesium silicate, aluminum silicate, calcium phosphate, and the like, e.g., KAOPOLITE. Another useful particulate antiblock agent is referred to as a non-meltable crosslinked silicone resin powder sold under the trademark "TOSPEARL" made by Toshiba Silicone Co., Ltd. and is described in U.S. Pat. No. 4,769,418. Another useful antiblock additive is a spherical particle made from methyl methacrylate resin having an average diameter of 1 to 15 microns, such an additive is sold under the trademark "EPOSTAR" and is commercially available from Nippon Shokubai.

Typical slip additives include higher aliphatic acid amides, higher aliphatic acid esters, waxes and metal soaps which can be used in amounts ranging from about 0.1 to about 2 weight percent based on the total weight of the layer. A specific example of a useful fatty amide slip additive is erucamide.

A conventional silicone oil additive having a viscosity of 10,000–60,000 cSt. is also contemplated.

Useful antioxidants are generally used in amounts ranging from about 0.1 weight % to about 2 weight percent, based on the total weight of the layer, phenolic antioxidants. One useful antioxidant is commercially available under the trademark "Irganox 1010".

Barrier additives may be used in useful amounts and may include low-molecular weight resins, hydrocarbon resins, particularly petroleum resins, styrene resins, cyclopentadiene resins and terpene resins.

Optionally, the outer layers are compounded with a wax for lubricity. Amounts of wax range from about 2 to about 15 weight % based on the total weight of the layer. Any conventional wax useful in thermoplastic films is contemplated.

The process of making the matte surface layer can be by masterbatch in which a minor proportion of a concentrated composition of polydialkylsiloxane and the matte surface thermoplastic polymer blend, along with any optional additives is prepared and mixed (usually by dry mixing) into a major proportion of the matte surface forming thermoplastic polymer blend. The amount of concentrate in the masterbatch usually ranges from about 5% by weight to about 50% by weight based on the total weight of the matte surface layer. The mixture is then melt mixed in an extruder or compounded in a twin screw extruder. Alternatively, the matte surface layer is prepared in one step by mixing the thermoplastic polymer blend, polydialkylsiloxane and, optionally, by any additives in the proportions used for making up the final matte surface layer composition.

Typically, the matte surface film is formed by coextruding the HDPE base layer together with the matte surface layer and any additional layer through a flat sheet extruder die at a temperature ranging from between about 200 to about 270° C., casting the film onto a cooling drum and quenching the film. The sheet is then stretched about 4 to about 8 times in the machine direction (MD) orienter followed by stretching about 6 to about 10 times in the transverse direction (TD) orienter. The film is then wound onto a reel. Optionally, one or both of the external surfaces are coated and/or flame treated or corona treated before winding.

In general, the film of the present invention comprises at least two to three layers: the base layer; the matte surface layer (usually the outermost skin layer); and optionally another layer (also usually the outermost skin layer) which is on the other side of the base layer opposite to the matte surface layer. It is contemplated that additional layers can be incorporated between the core layer and the outermost skin layers, e.g., tie layers comprising various polymers (e.g., polypropylene or polyethylene). The base layer usually represents about 70 to about 97 percent of the thickness of the total film. The skin layers are usually coextensively applied to each major surface of the base layer, typically by coextrusion, as noted above. The skin layers may not, ultimately, be the outermost layers of a final film product which includes the matte surface film.

The film may be used as a packaging film or as a printed film. The film may be printed by any conventional means, and contemplated printing means include letterpress, offset, silk screen, electrostatic and photographic methods. Specific printing methods contemplated include thermal dye transfer (including dye sublimation), lithographic printing, flexographic printing, gravure printing, hot stamping, valley printing, roll-leaf printing and spanishing. Polyolefins are normally treated before printing in order to make them receptive to inks. Treating methods include casing, electronic treating and flame treating.

EXAMPLES

The following examples illustrate the effectiveness of the present invention without limiting the scope thereof.

In each of the following examples, various properties, including the gauge (or thickness), haze, gloss, and cuttability, of the film are determined. The gauge is indicated in mils, the haze (%) is measured in accordance with ASTM D1003, and the gloss (at a 45° angle) is measured in accordance with ASTM D2457.

The cuttability test was conducted using a Milton-Bradley #5112 paper cutter. Specifically, a piece of the oriented film of about 8" by 8" in size was placed on a cutting board and cut into 1" wide strips with normal shearing force. The cut edge was then examined for smoothness. When the film was too soft, it could not be cut cleanly (i.e., the cut edges showed stretched edges as well as fine polymer strings).

Example 1

A three-layer oriented film comprising a base layer B, a matte surface layer A, and another layer C in an A/B/C configuration was produced. The base layer B was made of M6211 HDPE resin from Lyondell having a melt index of 1.1 g/10 minutes, a density of 0.958 g/cm$^3$, and a melting point of 130° C. The matte surface layer A was made of a blend of 50% by weight of XPM-7510 EPB terpolymer sold by Chisso Corporation and 50% by weight of PE-1845, which is a low density polyethylene having a density of 0.905 g/cm$^3$, sold by Dow Chemical Company. The third layer C was made of Chisso XPM-7510 EPB terpolymer. The three layers were coextruded through a flat sheet extruder die at a temperature of about 230° C., cast onto a cooling drum maintained at 40° C., and then quenched at 40° C. The sheet was then stretched about 5 times in the machine direction (MD) orienter at 105° C. and then about 8 times in the transverse direction (TD) orienter at 160° C.

The properties of the film are reported in Table 1.

Example 2

Example 1 was repeated, except a different resin blend was used to form the matte surface layer A. A blend of 50 wt % Chisso XPM-7510 and 50 wt % PP 3371, which is a polypropylene having a melt flow rate of 2.8 g/10 minutes, sold by Fina Oil and Chemical Company.

The properties of the film are shown in Table 1.

Example 3

Example 1 was repeated except the resin blend to produce the matte surface layer was replaced with M-6030, which is a HDPE from Lyondell Chemical Company.

The properties of the film are reported in Table 1.

Example 4

Example 1 was repeated, except the resin blend for the matte surface layer was replaced with a blend of 50% by weight of a HDPE with about 50% by weight of a conventional ethylene-propylene-butene-1 terpolymer. Specifically, the HDPE had a melting point of about 132 to about 134° C., a melt index of about 0.1 to 2 g/10 minutes, and a density of about 0.955 g/cm$^3$. The ethylene-propylene-butene-1 terpolymer mainly comprised propylene units with about 10% by weight or less of ethylene and 10% by weight or less of butene-1, and had a melting point of about 122 to about 126° C.

The results are shown in Table 1.

Example 5

Example 4 was repeated, except the gauge was changed from 1.15 to 1.50 mils.

The results are shown in Table 1.

Comparative Example 1

Example 1 was repeated, except the polymer blend of the matte surface layer was replaced with XPM-7510 EPB terpolymer from Chisso.

The properties of the film are reported in Table 1.

Comparative Example 2

Example 5 was repeated, except with the following changes: (1) the gauge was changed from 1.50 to 1.10 mils; (2) the base layer was made of Fina 3371, which is a propylene homopolymer sold by Fina Oil and Chemical Company, instead of HDPE M-6211; and (3) the layer C was omitted.

The properties are listed in Table 1.

Comparative Example 3

Comparative Example 2 was repeated, except the gauge was changed from 1.10 to 1.50 mils.

The properties are listed in Table 1.

Comparative Example 4

Comparative Example 3 was repeated, except Fina 3371 was replaced with Amoco 9218, which is a highly crystalline polypropylene, sold by BP-Amoco.

The properties are listed in Table 1.

Comparative Example 5

Comparative Example 4 was repeated, except the gauge was changed from 1.50 to 1.10 mils.

The properties are listed in Table 1.

Comparative Example 6

Comparative Example 5 was repeated, except the gauge was changed from 1.10 to 0.7 mil.

The properties are listed in Table 1.

Comparative Example 7

Comparative Example 2 was repeated, except the gauge was changed to 0.70 mil and the resin blend of the matte surface layer was replaced with Fina 3371 polypropylene resin containing 10% by weight of SYLISIA-340, which is a synthetic silica available from Fuji-Silysia Chemical Company.

The properties are listed in Table 1.

TABLE 1

| Example | Film Structure | Gauge (mils) | Haze (%) | Gloss (45°) | Cuttability (good, poor, etc.) |
|---|---|---|---|---|---|
| Ex. 1 | 50-50 blend of XPM-7510 and PE-1845/HDPE M-6211/XPM-7510 | 1.15 | 5.5 | 71 | good |
| Ex. 2 | 50-50 blend of XPM-7510 and PP 3371/HDPE M-6211/XPM-7510 | 1.15 | 3.5 | 79 | good |
| Ex. 3 | M-6030/HDPE M-6211/XPM-7510 | 1.15 | 4.3 | 78 | good |
| Ex. 4 | PE-EPB blend/HDPE M-6211/XPM-7510 | 1.15 | 41 | 23 | good |
| Ex. 5 | PE-EPB blend/HDPE M-6211/XPM-7510 | 1.50 | 39 | 23 | good |
| C. Ex. 1 | XPM-7510/HDPE M-6211/XPM-7510 | 1.15 | 4 | 78 | good |
| C. Ex. 2 | PE-EPB blend/Fina 3371 | 1.10 | 58 | 14 | poor |
| C. Ex. 3 | PE-EPB blend/Fina 3371 | 1.50 | 62 | 12 | poor |
| C. Ex. 4 | PE-EPB blend/Amoco 9218 | 1.50 | 61 | 13 | fair |
| C. Ex. 5 | PE-EPB blend/Amoco 9218 | 1.10 | 57 | 15 | fair |
| C. Ex. 6 | PE-EPB blend/Amoco 9218 | 0.70 | 58 | 16 | poor |
| C. Ex. 7 | Fina 3371 + 10% Sylysia-340/Fina 3371 | 0.70 | 38 | 34 | poor |

As seen from Table 1, Examples 1–5 and Comparative Example 1 provided good cuttability. Of these examples, Examples 4 and 5 gave good cuttability as well as low surface gloss (i.e., a good matte surface).

What is claimed is:

1. A matte surface film comprising:
   (a) a high density polyethylene (HDPE) base layer optionally comprising one or more additives; and
   (b) a matte surface layer comprising a blend of two or more incompatible polyolefins, the blend being selected from the group consisting of a high density polyethylene (HDPE)/ethylene-propylene-butylene (EPB) terpolymer blend, a polypropylene (PP)/HDPE blend, a PP/EPB terpolymer blend, an ethylene-propylene (EP) copolymer/polyethylene blend, and a PP/polyethylene/EPB terpolymer blend.

2. The matte surface film as claimed in claim 1, wherein the HDPE of said base layer has a density of about 0.940 to about 0.980 g/cm$^3$, a melting point of about 115 to about 140° C., and a melt index of about 0.5 to about 12 g/10 minutes, measured in accordance with ASTM D1238 under a load of 2.16 kg at 190° C.

3. The matte surface film as claimed in claim 1, wherein the polyethylene of the EP copolymer/polyethylene blend is a blend of two different ethylene polymers.

4. The matte surface film as claimed in claim 1, wherein the matte surface layer comprises a polydialkylsiloxane.

5. The matte surface film as claimed in claim 1, wherein at least one layer of said matte surface film further comprises an additive selected from the group consisting of antistatic agents, antiblock agents, slip additives, silicone oil having a viscosity of 10,000–60,000 centistokes, antioxidants, barrier additives, and wax.

6. The matte surface film as claimed in claim 1, further comprising an outer layer located on a side of the base layer opposite to the matte surface layer.

7. The matte surface film as claimed in claim 1, further comprising at least one tie layer.

8. A packaging film or a printed film comprising the matte surface film as defined in claim 1.

9. A process for producing a matte surface film, comprising:
   coextruding a high density polyethylene (HDPE) base layer together with a matte surface layer comprising a blend of two or more incompatible polyolefins through a flat sheet extruder die at a temperature ranging from between about 200 to about 270° C.;
   casting the film onto a cooling drum;
   quenching the film; and
   stretching the film in at least one direction,
wherein the blend is selected from the group consisting of a high density polyethylene (HDPE)/ethylene propylene butylene (EPB) terpolymer blend, a polypropylene (PP)HDPE blend, a PP/EPB terpolymer blend, an ethylene-propylene (copolymer/polyethylene blend, and a PP/polyethylene/EPB terpolymer blend.

10. A matte surface film comprising:
   (a) a base layer consisting essentially of high density polyethylene (HDPE), and optionally comprising one or more additives; and
   (b) a matte surface layer comprising a blend of two or more incompatible polyolefins, the blend being selected from the group consisting of a high density polyethylene (HDPE)/ethylene-propylene-butylene (EPB) terpolymer blend, a polypropylene (PP)/HDPE blend, a PP/EPB terpolymer blend, an ethylene-propylene (EP) copolymer/polyethylene blend, and a PP/polyethylene/EPB terpolymer blend.

11. A matte surface film as claimed in claim 10 wherein the high density polyethylene (HDPE) of said base layer has a density of about 0.940 to about 0.980 g/cm$^3$, a melting point of about 115 to about 140° C., and a melt index of about 0.5 to about 12 g/10 minutes, measured in accordance with ASTM D1238 under a load of 2.16 kg at 190° C.

12. The matte surface film as claimed in claim 10, wherein the polyethylene of the ethylene-propylene (EP) copolymer/polyethylene blend is a blend of two different ethylene polymers.

13. The matte surface as claimed in claim 10, wherein the matte surface layer comprises a polydialkylsiloxane.

14. The matte surface film as claimed in claim 10, wherein at least one layer of said matte surface film further comprises an additive selected from the group consisting of antistatic agent, antiblock agents, slip additives, silicone oil having a viscosity of 10,000–60,000 centistokes, antioxidants, barrier additives, and wax.

15. The matte surface film as claimed in claim 10, further comprising an outer layer located on a side of the base layer opposite to the matter surface layer.

16. The matte surface film as claimed in claim 10, further comprising at least one tie layer.

17. A packaging film or printed film comprising the matte surface film as defined claim 10.

* * * * *